R. L. OWENS.
CLEANING RACK FOR GRAIN SEPARATORS.
APPLICATION FILED AUG. 30, 1911.

1,029,507.

Patented June 11, 1912.

WITNESSES

INVENTOR
RICHARD L. OWENS
BY Paul & Paul
ATTORNEYS

COLUMBIA PLANOGRAPH CO., WASHINGTON, D. C.

UNITED STATES PATENT OFFICE.

RICHARD L. OWENS, OF MINNEAPOLIS, MINNESOTA.

CLEANING-RACK FOR GRAIN-SEPARATORS.

1,029,507. Specification of Letters Patent. Patented June 11, 1912.

Application filed August 30, 1911. Serial No. 646,868.

*To all whom it may concern:*

Be it known that I, RICHARD L. OWENS, of Minneapolis, in the county of Hennepin and State of Minnesota, have invented certain new and useful Improvements in Cleaning-Racks for Grain-Separators, of which the following is a specification.

This invention relates to improvements especially applicable to the type of grain separators usually known as fanning mills, and the object of the invention is to provide improved means for cleaning the screens of the lower shoe, although the device may be used in connection with other screens or sieves.

Figure 1:
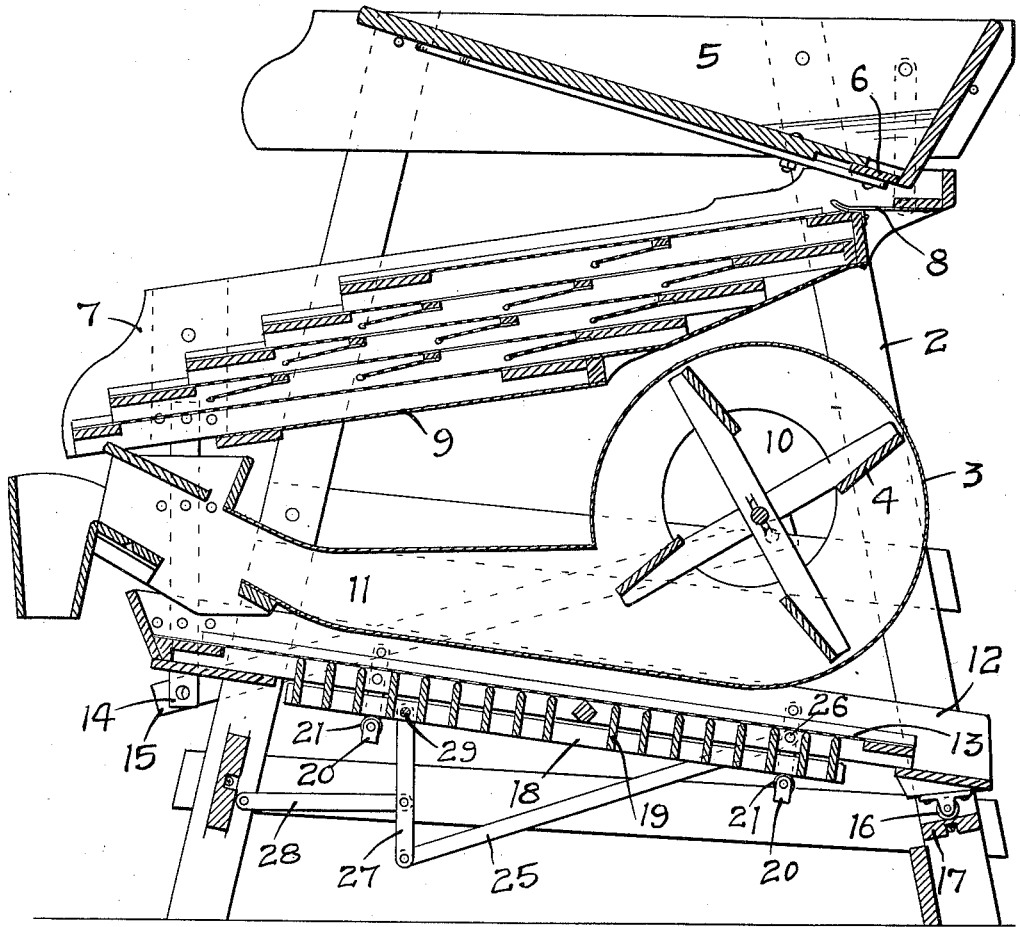
Figure 2:
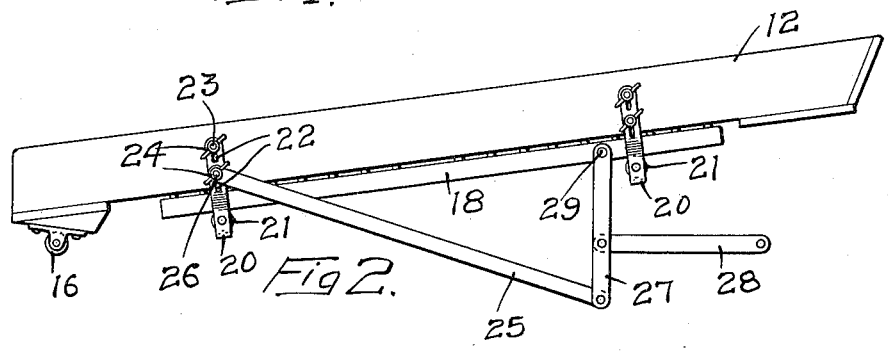

The invention consists generally in the constructions and combinations hereinafter described, claimed and particularly pointed out in the drawing, in which, Figure 1 is a longitudinal vertical section of a fanning mill having my invention applied thereto, Fig. 2 is a side elevation of the shoe and cleaning rack.

In the drawing, 2 represents the frame of the machine which may be of any suitable or preferred construction.

3 is the fan casing and 4 the fan located therein.

In the upper part of the frame 2 is a hopper 5 provided with a feed opening in the bottom and with an adjustable slide 6 for regulating the discharge of grain from said hopper. Below the hopper is a vibratory shoe 7, and the grain passes onto the receiving end of the upper sieve over a deck section 8 which is preferably provided with an upturned lower edge. The shoe 7 is preferably provided with a series of sieves of any preferred construction. I usually employ sieves having perforate and imperforate sections, with short perforate sections on each sieve arranged beneath the perforate sections of the sieve above. I do not, in this application, claim this arrangement in combination with the sieves and sieve sections, as I have shown, described and claimed the same in Letters Patent No. 964,307, granted to me July 12th, 1910. The shoe 7 is preferably provided below its lower sieve with an imperforate deck section 9, which extends near to the lower end of the bottom sieve and over which any material that passes through the lower sieve is conducted. The fan casing is preferably provided with a large central opening or eye 10, and from this casing a discharge trunk 11 leads toward the front end of the machine, preferably terminating just below the end of the shoes.

In the lower part of the machine I preferably provide a lower or second shoe 12 having one or more sieves 13. The front or receiving end of the shoe 12 is preferably mounted upon the lower ends of suitable hangers 14, the upper sieve being preferably connected to the upper ends of the same hangers, which are vibrated by a connecting rod 15 extending to a crank on the fan shaft. The lower end of the shoe 12 is preferably provided with small wheels or rollers 16, and these rest upon the upper surface of a centrally pivoted plate 17. As this shoe is reciprocated the rolls or wheels move back and forth over the upper surface of the plate 17, and by adjusting these plates the lower end of the shoe may be given either a smooth, sliding motion or an abrupt oscillation or an intermediate movement. By this means the grain in the lower sieve may be caused to slide smoothly over said sieve or may be agitated more or less violently as it passes thereover. Secured to the frame of the said lower sieve 12 is a cleaning rack consisting of longitudinal bars 18 provided within the sieve frame with a series of vertical slats 19, extending transversely and having their upper edges, which are preferably quite narrow, in contact with the under surface of the screen 13. This rack is supported within the said sieve frame by adjustable hangers 20 carrying rollers 21 upon which the bars 18 rest. This cleaning rack is, therefore, capable of reciprocation with the edge of its cross slats in contact with the under surface of the screen.

The hangers 20 are provided with vertical slots 22 and bolts 23, secured in the side of the sieve frame, project through the slots in said hangers and are provided with thumb nuts 24, by means of which said hangers may be secured in any desired position. A shaker bar 25 has one end secured to the side of the shoe or sieve frame at 26, and its opposite end connected to the lower end of a shaker lever 27, whose upper end is pivotally connected to the side bar 18 of the cleaning rack. A pivoted bar 28 has one end connected to the frame of the machine and its other end connected to the shaker lever 27. The end of the shaker lever is preferably connected to the rack frame by being coupled to the ends of a rod 29, which passes transversely through said rack frame and has its ends projecting beyond the same so as to be engaged by said shaker levers. As the lower sieve and its shoe are reciprocated from the crank shaft of the frame by means of the hangers already described, the cleaning rack is also reciprocated, the movements of the rack and shoe being opposite to each other; that is to say, as the rack moves in one direction the shoe and screen move in the other direction.

The advantages in having the cleaning rack mounted on the sieve frame and reciprocating in opposite directions to the movements of the shoe, are many. The pitch of the sieve and its movement may be regulated by means of the adjustable plate 17 without changing the relation of the cleaning rack to the sieve. By having both the rack and the sieve move in opposite directions, double the amount of surface is covered than would be if either the sieve or the cleaning rack alone was reciprocated. As the slats of the rack become worn the rack can be adjusted by means of slotted hangers so that the edges of the cleaning bars will always be in proper relation to the under surface of the sieve.

The details of the construction may be varied in many particulars without departing from my invention.

I claim as my invention:

1. The combination, with a grain shoe, having a suitable sieve mounted therein, and means for adjusting the angle or inclination of said shoe, of a cleaning rack mounted upon said shoe and adjustable therewith and having a series of transverse, upright slats arranged with their edges in contact with the under surface of said sieve, and means for reciprocating said shoe and said rack simultaneously in opposite directions.

2. The combination, with a grain shoe, having a suitable sieve mounted therein, of an adjustable plate, rollers on the lower end of said shoe arranged to move over said plate, a cleaning rack mounted upon said shoe and adjustable therewith, and having a series of transverse, upright slats arranged with their edges in contact with the under surface of said sieve and means for reciprocating said shoe and said rack simultaneously in opposite directions.

3. The combination, with a grain shoe having a suitable sieve mounted therein, of a cleaning rack mounted upon said shoe and adjustable therewith and having a series of transverse upright slats arranged with their edges in contact with the under surface of said sieve, means for adjusting at will the lower end of said sieve and means for reciprocating said shoe and said rack simultaneously in opposite directions, substantially as described.

4. The combination with a grain shoe having a suitable sieve mounted therein, of an adjustable plate 17, rollers 16 on the lower end of said shoe arranged to move over said plate, means for adjusting said plate, a cleaning rack mounted upon said shoe and adjustable therewith and having a series of transverse, upright slats arranged with their edges in contact with the under surface of said sieve, and means for reciprocating said shoe and said rack simultaneously in opposite directions, substantially as described.

In witness whereof, I have hereunto set my hand this 19th day of August, 1911.

RICHARD L. OWENS.

Witnesses:
C. M. SHEARER,
E. M. KARLEN.

---

Copies of this patent may be obtained for five cents each, by addressing the "Commissioner of Patents, Washington, D. C."